Jan. 1, 1935. R. L. CLARK 1,986,712
OBSERVATION COMPARTMENT FOR PRISONS AND THE LIKE
Filed Aug. 21, 1930 2 Sheets-Sheet 1
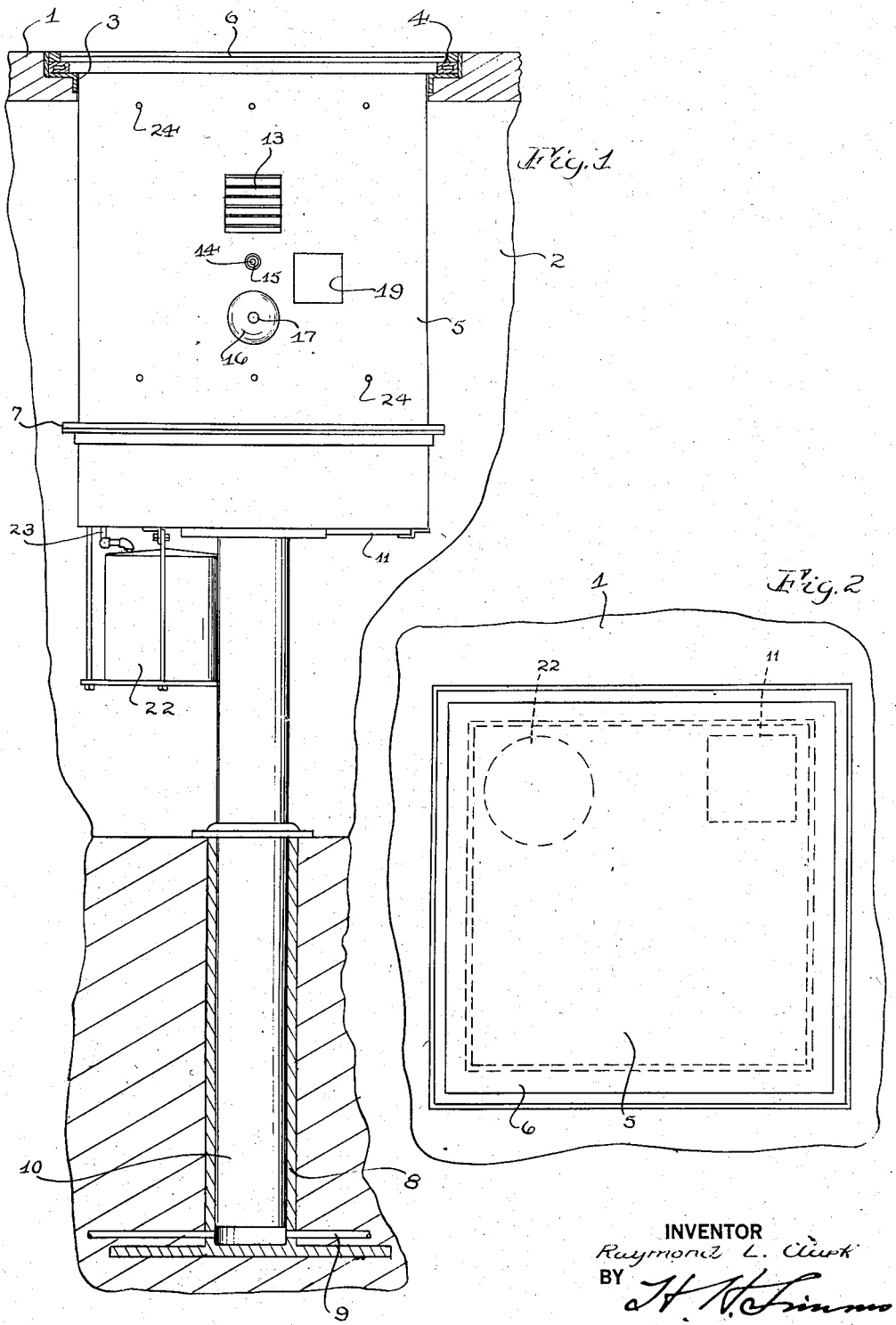
INVENTOR
Raymond L. Clark
BY
HIS ATTORNEY Jan. 1, 1935.  R. L. CLARK  1,986,712
OBSERVATION COMPARTMENT FOR PRISONS AND THE LIKE
Filed Aug. 21, 1930  2 Sheets-Sheet 2

INVENTOR
Raymond L. Clark
BY
His ATTORNEY

Patented Jan. 1, 1935

1,986,712

UNITED STATES PATENT OFFICE 1,986,712

OBSERVATION COMPARTMENT FOR PRISONS AND THE LIKE

Raymond L. Clark, Rochester, N. Y., assignor, by mesne assignments, to Armorite Equipment Incorporated, Rochester, N. Y., a corporation of New York Application August 21, 1930, Serial No. 476,780

6 Claims. (Cl. 89—36)

The present invention relates to observation compartments for prisons and the like, and an object of the invention is to provide an observation compartment adapted to lie below a prison area but to be projected so that guards may, without danger to themselves, observe and control the prisoners in such area. Another object of the invention is to provide an observation compartment which may be raised into or dropped below a given surface to observe and control prisoners above said surface.

To these and other ends, the invention consists of certain parts and combinations of parts all of which will be hereinafter described: the novel features being pointed out in the appended claims:

In the drawings:

Fig. 1 is a side view of the observation compartment in its lowest position, parts being shown in section;

Fig. 2 is a plan view of the compartment in lowered position; and

Figure 3:
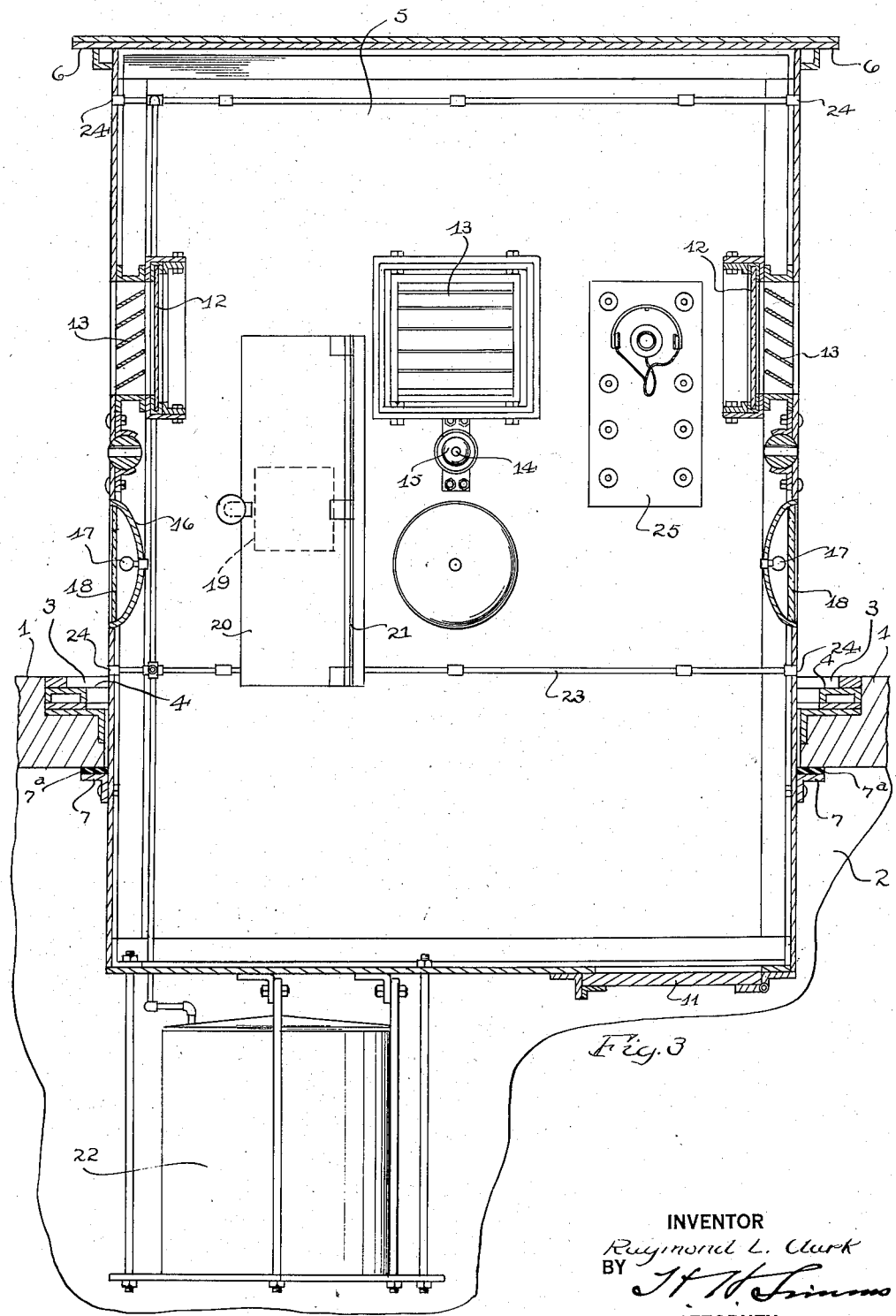
Fig. 3 is a vertical section through the compartment in its raised position.

In the illustrated embodiment of the invention, 1 indicates a flooring above a compartment such as a room or tunnel 2. This flooring has an opening 3 into the room or tunnel 2 formed with a surrounding gas and water-proof seat 4. In this embodiment there is arranged to operate vertically in the opening a movable observation compartment 5 which has a surrounding flange 6 adjacent its top to cooperate with the seat 4, and also a surrounding flange 7 formed with a gas-proof gasket 7ª to cooperate with the flooring 1 about the opening 3. These flanges 6 and 7 also serve to limit the upward and downward movements of the compartment. Any suitable mechanism preferably controlled from within the compartment may effect the raising and lowering of the compartment. In this instance, a hydraulic hoist is employed comprising a fixed cylinder 8 into and from which the fluid is conducted by pipes 9, said cylinder having a plunger 10 operating therein and connected to the under side of the bottom wall of the compartment.

The walls of the compartment are preferably formed of bullet-proof material and the compartment is made so as to be as near gas-proof as possible. The bottom wall of the compartment has an entrance opening closed by a door 11 through which access to or exit from the compartment may be obtained from or to the room or tunnel 2 beneath the flooring 1. The compartment may have view openings or windows in its side walls closed by bullet-proof glass plates 12 protected on the outside by louvres having bullet-proof slats 13. Openings 14 in the balls 15 may be provided in the side walls for the projection of firearms therethrough. The balls are preferably situated beneath the windows so that the latter may be employed for directing the firearms. At the same time, the balls may be turned to close the openings 14.

Beneath each view opening may be arranged an illuminating means for projecting light rays from the interior of the movable compartment into the room or area in which the compartment is elevated. In this instance, concavo convex reflectors 16 formed of bullet-proof material are inserted in openings in the side wall of the compartment and have incandescent bulbs 17 in front of them covered by a bullet-proof lens 18.

Openings or ports 19 may be provided in the side walls of the compartment through which gas bombs may be thrown. Each of these ports is closed by a door 20 hinged at 21 to turn about an upright axis and projecting above and below the port to protect the one throwing the bombs through the port against projectiles fired by the prisoners.

The gassing of the prisoners may also be effected by a gassing system associated with the compartment. This system, in this instance, comprises a gas storage tank 22 having piping 23 leading to two annular series 24 of discharge nozzles arranged in two different horizontal planes about the compartment to project gas into the prison area without danger to the occupants of the chamber. Within the chamber may be arranged an instrument board 25 through which any suitable devices or apparatus may be controlled from the compartment.

These compartments may be installed to operate at any points of vantage within a prison either in the buildings or prison yard. When lowered their tops are in the plane of the area which is to be controlled, so that they are inconspicuous, and cannot be tampered with. In time of trouble, the compartments are projected so that the guards may observe conditions, and, through firearms or gas, control any situation that may arise, without danger to themselves. The guards may enter the bottom of the compartment when the latter is either raised or lowered, without subjecting themselves either to gas or projectiles from firearms. The guards may readily fire at any or more prisoners to subdue the others or may gas the entire lot either through throwing bombs or the gassing system. The illumination of the observed area is obtained without at the same time illuminating the interior of the compartment.

What I claim as my invention and desire to secure by Letters Patent is:

1. In a penal or like institution having upper and lower chambers separated by a floor having an opening, a bullet-proof casing slidable vertically through said opening and having a compartment and also having exterior spaced upper and lower outwardly directed flanges to engage opposite faces of said floor adjacent said opening to limit the vertical movements of said casing through said opening, said casing having an opening in the bottom adjacent one side thereof, a closure for the latter opening, a gas tank casing suspended from the lower end of the bullet-proof casing at the side thereof opposite said bottom opening and in spaced relation to the bottom opening of said bullet-proof casing and vertically movable with the latter, a pipe system including a vertical pipe leading upwardly from the gas tank casing through the bottom of the bullet-proof casing, horizontal branch pipes extending from the vertical pipe and opening through opposite sides of the bullet proof casing near the top thereof to discharge gas from the sides of the bullet-proof casing into said upper chamber when the outlet ends of said horizontal pipes pass upwardly beyond said floor as the bullet-proof casing moves upwardly, and a lower set of horizontal branch pipes leading from said vertical pipe and opening through opposite sides of the bullet-proof casing for discharge of gas into the upper chamber adjacent said floor level when the compartment has reached its uppermost limit of movement, and means in the side walls of the compartment to enable occupants thereof to view prisoners in said upper chamber without danger to the personal safety of the occupants of the bullet-proof casing.

2. In a penal or like institution having upper and lower chambers separated by a floor having an opening, a bullet-proof casing slidable vertically through said opening and having a compartment therein and also having exterior spaced upper and lower outwardly directed flanges to engage the upper and lower faces of said floor adjacent said opening in said floor to limit the vertical movements of said casing through said opening, said casing having an opening to permit ingress and egress to and from the casing, a gas tank casing connected with said bullet-proof casing for vertical movement therewith, a pipe system leading from said tank casing into said compartment and including branches near the top of the bullet-proof casing compartment and leading through the sides of the bullet-proof casing to discharge gas from the bullet-proof casing into said upper chamber after slight upward movement of said bullet-proof casing and including other branch pipes leading from said vertical pipe through the side walls of the bullet-proof casing to discharge additional gas into said upper chamber after the compartment has reached the limit of its uppermost movement, said bullet-proof casing having view openings in the side walls thereof to permit a vision from the compartment through the bullet-proof casing.

3. In a penal or like institution having upper and lower chambers separated by a floor having an opening, a bullet-proof casing slidable vertically through said floor opening and having exteriorly spaced upper and lower outwardly directed flanges to engage the upper and lower faces of said floor adjacent said floor opening to limit the vertical movements of said compartment through said floor opening, said casing having an opening to permit ingress and egress to and from the casing compartment, a gas tank casing connected with said bullet-proof casing for movement therewith, a pipe system leading from said tank casing into said compartment and including branches near the top of the compartment and leading through the sides of the bullet-proof casing to discharge gas into said upper chamber after slight upward movement of said casing and including other branch pipes leading from said vertical pipe through the side walls of the bullet-proof casing to discharge additional gas into said upper chamber to supplement the amount of gas first projected into said upper chamber through said pipe branches.

4. In a penal or like institution having upper and lower chambers separated by a floor having an opening, a bullet-proof casing slidable vertically through said opening and having a compartment therein and also having spaced upper and lower exterior outwardly directed flanges to engage the upper and lower faces of said floor adjacent said floor opening to limit the vertical movements of said casing through said opening, said casing having an opening to permit ingress and egress to and from the compartment of the casing, a gas tank casing connected with said bullet-proof casing for movement therewith, a pipe system leading from said tank casing into said compartment and including branches near the top of the compartment and leading through the sides of the bullet-proof casing to discharge gas into said upper chamber after slight upward movement of said bullet-proof casing and including other branch pipes leading through the side walls of the bullet-proof casing to discharge additional gas into said upper chamber adjacent said floor when the bullet-proof casing has reached the uppermost limit of vertical movement.

5. In a penal or like institution having upper and lower chambers separated by a floor having an opening therein, a vertically movable bullet-proof observation casing having a compartment therein and being slidable vertically through said floor opening, means for moving said bullet-proof casing, the bullet-proof casing having an opening to permit ingress and egress into and out of the compartment of said casing, a closure for said casing opening, a gas tank carried by said casing, a pipe system leading from the gas tank into the compartment of said casing and including upper and lower series of gas outlets leading from the compartment of said casing through the side walls of the casing.

6. In a penal or like institution having upper and lower chambers separated by a floor having an opening therein, a bullet-proof observation casing having a compartment therein and slidable vertically through said floor opening, means for moving said compartment, the bullet-proof casing having an opening to permit ingress and egress into and out of said compartment of the casing, a closure for said casing opening, a gas tank casing carried by said bullet-proof casing, a pipe system leading from the gas tank casing into the compartment of the bullet-proof casing and including upper and lower series of gas outlets leading from the compartment of the bullet-proof casing through the side walls thereof, and including nozzles arranged at spaced points to discharge gas in all directions into the upper chamber above said floor.

RAYMOND L. CLARK.